United States Patent [19]

Chang et al.

[11] Patent Number: 5,232,756
[45] Date of Patent: Aug. 3, 1993

[54] RELEASE FILM WITH REDUCED TRANSFERABLE SILICONE MATERIAL

[75] Inventors: Keunsuk P. Chang; Leland W. Reid, both of Fairport, N.Y.

[73] Assignee: Mobil Oil Corporation, Fairfax, Va.

[21] Appl. No.: 812,496

[22] Filed: Dec. 23, 1991

[51] Int. Cl.5 .............................. B32B 7/06; B32B 7/10
[52] U.S. Cl. .................................... 428/40; 428/317.9; 428/447; 428/906; 283/81
[58] Field of Search ....................... 428/317.9, 40, 906, 428/447; 283/81

[56] References Cited

U.S. PATENT DOCUMENTS

| | | | |
|---|---|---|---|
| 4,377,616 | 3/1983 | Ashcraft et al. | 428/213 |
| 4,678,846 | 7/1987 | Weitemeyer et al. | 525/477 |

Primary Examiner—Alexander S. Thomas
Attorney, Agent, or Firm—A. J. McKillop; G. W. Hager; J. P. O'Sullivan, Sr.

[57] ABSTRACT

A release film for label stock and the like having:
  (a) a cavitated layer of a thermoplastic polymer matrix material within which is located a strata of voids, positioned at least substantially within at least a substantial number of each of the voids is at least one spherical void-initiating solid particle which is phase-distinct and incompatible with the matrix material, the void space occupied by the particle being substantially less than the volume of the void, with one generally cross-sectional dimension of the particle at least approximating a corresponding cross-sectional dimension of the void; the population of the voids being such as to cause a degree of opacity of less than 70% light transmission;
at least one surface of the layer free of any coating tending to mask the surface affects of cavitation; and
  (b) opposite to this surface, a coating of a release material of a type having a tendency to partially transfer to any contacting surface.

10 Claims, No Drawings

RELEASE FILM WITH REDUCED TRANSFERABLE SILICONE MATERIAL

BACKGROUND OF THE INVENTION

The present invention relates to a release film, a major utility of which is to protect and carry label stock until the label is put into use on an appropriate surface.

For many years labels have been prepared with a pressure sensitive adhesive applied to one side thereof. Obviously some means had to be provided to protect the adhesive surface in advance of applying the label to the ultimate surface to be labeled. A technique has evolved over the years by which the pressure sensitive adhesive surface is protected by bringing the adhesive surface into contact with a release layer which has little tendency to aggressively adhere to the pressure sensitive adhesive surface. Thus, a second film having a release surface is brought into contact with the pressure sensitive surface carried by the label and thus protects the pressure sensitive adhesive until the label is to be applied to its ultimate surface.

Release films can be manufactured separately from the label face stock. The release film is manufactured and then convolutely wound into roll stock, which is thereafter unwound and slit during the manufacture of release film of a particular width dimension suited for a particular label dimension. Often times the release film roll stock manufacturer sells the roll film to a different commercial entity which performs one or more of the follow-on steps leading to the ultimate release film-label combination for end use on a particular surface or product.

A problem which manifests itself during the manufacture of release film is the transfer of areas of release material to the back surface of the film. This transfer leads to printing problems during completion of the release film-label stock combination. After the release film is mated with adhesively backed label stock, the label surface is printed with the appropriate label indicia. This printing operation is a step which often occurs after the release liner and label stock has been mated and convolutely wound. If during winding and unwinding of the release film, release material is inadvertently transferred to the back surface of the release film, this unwanted transfer can, in turn, be transferred to the surface to be printed and the printing ink will not adhere to such surfaces. This condition, at this point in the operation, results in a costly rejection of the release film-label combination.

It is an object of the present invention is to present a release film, which will not transfer release material to any part of a label surface intended to be printed.

SUMMARY OF THE INVENTION

The present invention is concerned with a release film for label stock and the like comprising:
 (a) a cavitated layer comprising a thermoplastic polymer matrix material within which is located a strata of voids, positioned at least substantially within at least a substantial number of each of said voids is at least one spherical void-initiating solid particle which is phase distinct and incompatible with said matrix material, the void space occupied by said particle being substantially less than the volume of said void, with one generally cross-sectional dimension of said particle at least approximating a corresponding cross-sectional dimension of said void; the population of said voids being such as to cause a degree of opacity of less then 70% light transmission;
 at least one surface of said layer free of any coating tending to mask the surface affects of cavitation; and
 (b) opposite to said surface, a coating of a release material of a type having a tendency to partially transfer to any contacting surface.

It is to be understood that the cavitated layer may be bonded to a noncavitated thermoplastic layer which then constitutes a film combination. This combination can be formed by coextruding the noncavitated layer with the layer to be cavitated followed by biaxial orientation. Alternatively a noncavitated layer can be formed separately and laminated to the cavitated layer. A preferred class of release material which is coated on the side of the film opposite to the cavitated material are the silicon acrylates.

DETAILED DESCRIPTION OF THE INVENTION

As indicated above release materials of the broad class of silicon acrylates, tend to be transferable to an unwanted extent when, for example, a release film carrying a layer of the same is convolutely rolled into a roll stock. When the roll is unwound in order to employ the release film as a support or protective layer over a pressure sensitive adhesive backed label stock, the unwanted material can be transferred to the surface of the label stock when this combination is convolutely rolled to form a release sheet-label stock combination. Apparently there is some unreacted moiety, perhaps liquid in nature, in the release material which transfers to the back side of the release film and, later, is in turn transferred to the surface of the label stock. The presence of this material interferes with printing and leads to an expensive quality rejection of the product.

It has been discovered that if a particular cavitated film is employed as the support substrate for a release layer the cavitated film, in some way not completely understood, solves the problem of this unwanted transfer. It can be speculated that the unwanted transfer of part of the release material still occurs but is absorbed within the cavitated structure of the cavitated film. Whatever the true mechanism is, it is not important so long as the problem of transfer is solved.

The contemplated cavitated films are described in U.S. Pat. No. 4,377,616 to Ashcraft et al. This patent is incorporated herein in its entirety. One modification in the preparation of cavitated films according to this patent is required. The patent is directed to a cavitated film which has void-free, transparent, thermoplastic skin layers adhering to the surfaces of a cavitated core layer. For purposes of the present invention the cavitated structure must have at least one surface free of any skin layer and, both surfaces may be free of thermoplastic skin layers.

A cavitated film having one clear skin surface can be prepared in the following manner. A mixture of isotatic polypropylene (93 parts, mp 160° C. and a melt index of 4.5) and nylon-6 (7 parts, mp 225° C.) is melted in an extruder provided with a screw of L/D ratio of 20/1. A second extruder is in association with this first mentioned extruder and supplied with the same polypropylene but without the nylon-6 present. A melt coextrusion is carried out, keeping the nylon free polypropylene on one side of the structure. A film structure is coextruded with a base thickness of 70% and a skin layer of 30% of the total thickness. The oriented film measures approximately 40 mils in thickness. This sheet is subsequently oriented 7×7½ times using a commercially available sequential biaxial orientation apparatus. The MD orientation temperature is about 105° C. and the TD orientation 135° C. The resulting 1.9 film has an opacity of 20% transmission. This represents an excellent base film for the release films of the present invention. With such structures it is preferred that the cavitated layer be from about 70–100% of the overall structure. If a skin is to be present on one side thereof, i.e., the side to receive the release material the skin can be up to 30% of the thickness of the base film.

The cavitated layer can be of any thermoplastic polymer which can be cavitated in the manner described in U.S. Pat. No. 4,377,616. As indicated, the preferred polymer is polypropylene and particularly preferred is an isotatic polypropylene.

Preferred cavitating agents disbursed within the matrix polymer include the polyamides of commerce, certain polyesters, such as polybutylene terephthalate, acetals, acrylic resins, inorganic, materials, such as, glass spheres, metal beads, ceramic spheres, calcium carbonate, etc.

After the biaxially oriented cavitated film structure is prepared with at least one cavitated surface thereof exposed and not covered with a skin layer, a release material is applied to the side of the film opposite to the exposed surface. Commercially available release materials are known as "silicone-acrylate" materials. Materials of this type are available from T. Goldschmidt AG of Essen, Germany. Representative materials are described in U.S. Pat. No. 4,678,846 to Weitemeyer et al. This patent is incorporated herein by reference in its entirety. These abhesive materials are acrylate or methacrylate ester modified organopolysiloxane mixtures comprising essentially equilibriated organopolysiloxane with, on average, more than 25 to fewer than 200 slicon atoms and additional containing 2 to 30 wt. % of organopolysiloxane with, on average, 2 to 25 silicon atoms and 2 to 30 wt. % of organopolysiloxane with, on average, 200 to 2000 silcon atoms.

The release material described above are represented of release materials employed in the manufacturer of release films for the support and protection of pressure sensitive adhesive backed label stock. As indicated above, release materials of this type can be transferred to the back side of a release film. For reasons not completely understood, by employing the described cavitated film as the substrate for the release material, whatever amount or portion of the release material that is transferred to the exposed surface of the cavitated substrate, is rendered innocuous as far as any subsequent transfer is concerned.

Improved results can be achieved by adding a surfactant material to the cavitated film. This can be done by compounding the film to be cavitated at the same time the cavitating agent is added. Typical surfactants include: polyoxylstearate, sorbitan monostearate, etc. They can be compounded into the film polymer from about 500 to about 5000 ppm.

It is to be understood that this disclosure is by way of example and that various changes may be made by adding, modifying or eliminating details without departing from the fair scope of the teaching contained in this disclosure. The invention is, therefore, not limited to particular details of this disclosure except to the extent following claims are necessarily so limited.

What is claimed is:

1. A release film for label stock comprising:
   (a) a cavitated layer comprising a thermoplastic polymer matrix material within which is located a strata of voids, positioned at least substantially within at least a substantial number of each of said voids is at least one spherical void-initiating solid particle which is phase-distinct and incompatible with said matrix material, the void space occupied by said particle being substantially less than the volume of the void, with one generally cross-sectional dimension of said particle at least approximating a corresponding cross-sectional dimension of said void; the population of said voids being such as to cause a degree of opacity of less than 70% light transmission;
   at least one surface of said layer free of any coating tending to mask the surface affects of cavitation; and
   (b) on the surface opposite the uncoated surface a coating of a release material having a tendency to partially transfer to any contacting surface.

2. The release film of claim 1 wherein said cavitated layer is bonded to a noncavitated thermoplastic layer.

3. The release film of claim 2 wherein said noncavitated layer was oriented with said cavitated layer.

4. The release film of claim 2 wherein said noncavitated layer is laminated to said cavitated layer.

5. The release film of claim 1 wherein said release material is a silicone release material.

6. The release film of claim 5 wherein said silicone release material is a silicone acrylate release material.

7. The release film of claim 1 in convolutely wound roll form.

8. The release sheet of claim 1 in combination with a label face stock by means of a pressure sensitive adhesive interfaced between said coating of release material and said label face stock.

9. The combination of claim 8 in convolutely wound roll form.

10. The release sheet of claim 1 including a surfactant in the matrix material.

* * * * *